R. WALMSLEY.
VALVE FOR PNEUMATIC TIRES.
APPLICATION FILED OCT. 1, 1915.

1,292,934.

Patented Jan. 28, 1919.

UNITED STATES PATENT OFFICE.

ROBERT WALMSLEY, OF DIDSBURY, MANCHESTER, ENGLAND.

VALVE FOR PNEUMATIC TIRES.

1,292,934.   Specification of Letters Patent.   Patented Jan. 28, 1919.

Application filed October 1, 1915. Serial No. 53,545.

*To all whom it may concern:*

Be it known that I, ROBERT WALMSLEY, a British subject, residing at Didsbury, Manchester, county of Lancaster, England, have invented certain new and useful Improvements in Valves for Pneumatic Tires, of which the following is a specification.

This invention relates to valves for pneumatic tires which serve as an inlet valve, a safety or relief valve and a gage to indicate the pressure in the tire.

It consists essentially of an inlet valve so constructed with a valve holder or plunger movable against the force of a spring and fitted with a diaphragm or sleeve of rubber to make a frictionless air-tight joint to permit the unrestricted movement thereof to indicate the pressure within the tire and to open the valve and allow the air to escape on the pressure exceeding a predetermined degree.

It will be fully described with reference to the accompanying drawings.

Figures 1, 2:
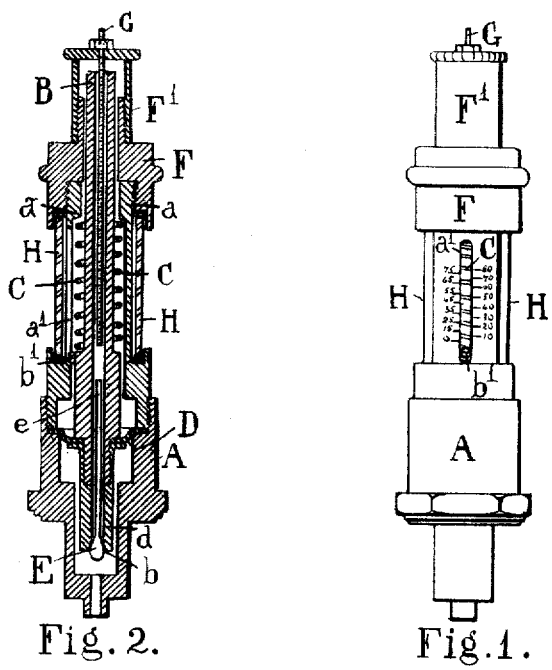
Figure 1 is an elevation of the improved valve.
Fig. 2 is a sectional elevation of the valve showing position without internal pressure.

The valve is constructed with an outer casing or cylinder A to be attached to the tire in the usual way and fitted therein is a hollow plunger B which carries the air inlet valve E and is capable of moving or sliding longitudinally within the casing A.

The casing or cylinder A is open at its lower end to communicate with the interior of the pneumatic tube of the tire so that the air pressure therein acts against one side of the hollow plunger to force it outward, a spring C resting on a shoulder acting to force it inward in the reverse direction. A diaphragm or rubber washer or rubber sleeve D is fitted between the plunger B and the casing A to render the plunger air-tight without friction, so as to prevent escape of air from the tube. The diaphragm is secured to the plunger B by a nut $d$ on the plunger, and is also secured in any desired manner to the casing A, for instance by two parts of the casing screwed together. The spring C by which the hollow plunger is controlled is of such a strength as to resist the maximum air pressure of the tire and at its upper end abuts against a shoulder $a$, or the spring may be replaced by a stronger or weaker one to suit different pressures.

The air inlet and relief valve E is fitted into the hollow plunger B with a valve seat $b$ on the lower or inner end of the plunger and a stem or spindle projecting into the interior of the plunger.

The upper end of the cylinder or casing A comprises a cap or cover F screwed thereon or otherwise attached thereto.

The casing A is provided with a slot $a'$ through which the movement or position of the hollow plunger B therein can be viewed and it is calibrated with a scale in pounds to indicate the pressure exerted by the spring and to show the internal pressure in the tire.

The plunger B is fitted with an index finger $b'$ which moves to and fro with it and is visible through the slot $a'$ to indicate by its position against the scale the internal pressure in the tire.

The end of the plunger B extends or projects through the cap or cover F to which the tube of an air pump or compressor may be attached to force air through the plunger and past the air valve E to inflate the tire, the said plunger end being protected by a removable cap F'. To the removable cap F' a pin G is fitted to enter the upper end of the plunger B and project down into it toward the stem $e$ of the valve E. The position of the pin G relatively to the stem or spindle of the air valve may be varied either by adjusting the position of the cap or cover F' or by adjusting the pin itself independently of said cover. The cover F' and the pin G attached to it are removed to pump in air to inflate the tire the pump tube being screwed onto the upper end of the hollow plunger B.

To prevent dust, water or other foreign matter having access to or entering through the slot $a'$ into the interior of the casing A the slot is covered with a transparent material through which the index finger $b'$ can be viewed. A tube H of glass, mica, or other transparent material is fitted over the exterior of the casing A and is held in position by the cap F being screwed down tightly upon it, the ends of the tube fitting in grooves or seats in said cap and in the adjacent member of the casing, which seats are provided with suitable packing.

In operation the cap F' is removed and the tire inflated by attaching the air pump or air compressor to the top end of the hollow plunger B and forcing air in past the valve E. As the pressure increases the hollow plunger B rises against the resistance of the spring C until the index finger $b'$ indicates that the desired pressure is reached, after which cap $F'$ is replaced, the end of the valve spindle then being also in contact with the fixed pin G. Should the pressure subsequently increase through expansion of the air or other cause the plunger B rises still farther, whereby said pin is caused to strike against the valve spindle, thus preventing the latter from rising with said plunger and, in consequence, removing the valve E from its seat, allowing air to escape, and thereby relieving any excess pressure. When the pressure becomes normal again the plunger B sinks and the device E closes.

The valve thus serves the purposes of an inlet air valve, a gage and a relief or safety valve for the tire.

What I claim as my invention and desire to protect by Letters Patent is:—

A valve for pneumatic tires of the type embodying a casing with a tubular plunger therein movable endwise under pressure of air against the resistance of a spring and having a normally closed release valve and spindle associated therewith and means for automatically opening said valve, combined with an elongated tubular nut having a threaded socket engaging one end of the plunger and provided with a valve seat in its free end for said release valve, and a flexible diaphragm around the plunger and secured at the inner portion thereof against said plunger by the end of the threaded socket of the nut, the outer portion of the diaphragm being secured between portions of the casing.

In testimony whereof I have hereunto set my hand in presence of two subscribing witnesses.

ROBERT WALMSLEY.

Witnesses:
J. OWDEN O'BRIEN,
T. W. ANDREW.